Oct. 24, 1933.  G. E. HOPKINS  1,931,925
MASS TESTING MACHINE
Filed July 8, 1932  2 Sheets-Sheet 2
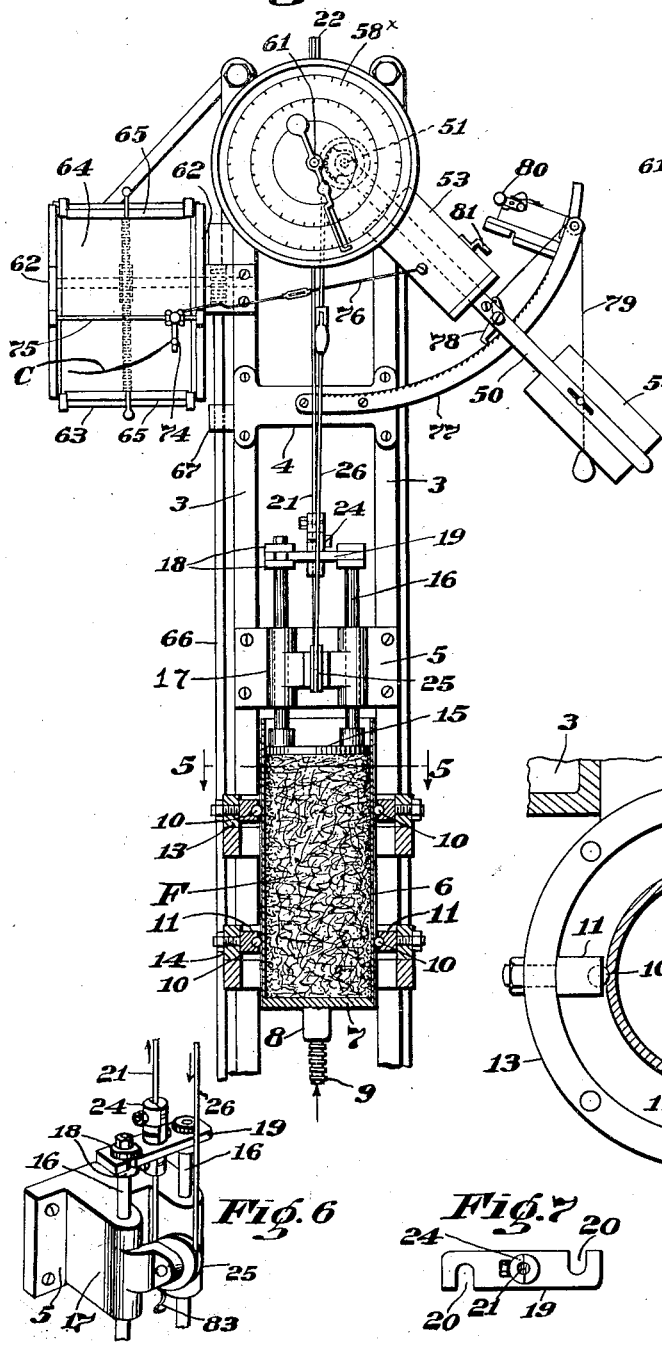
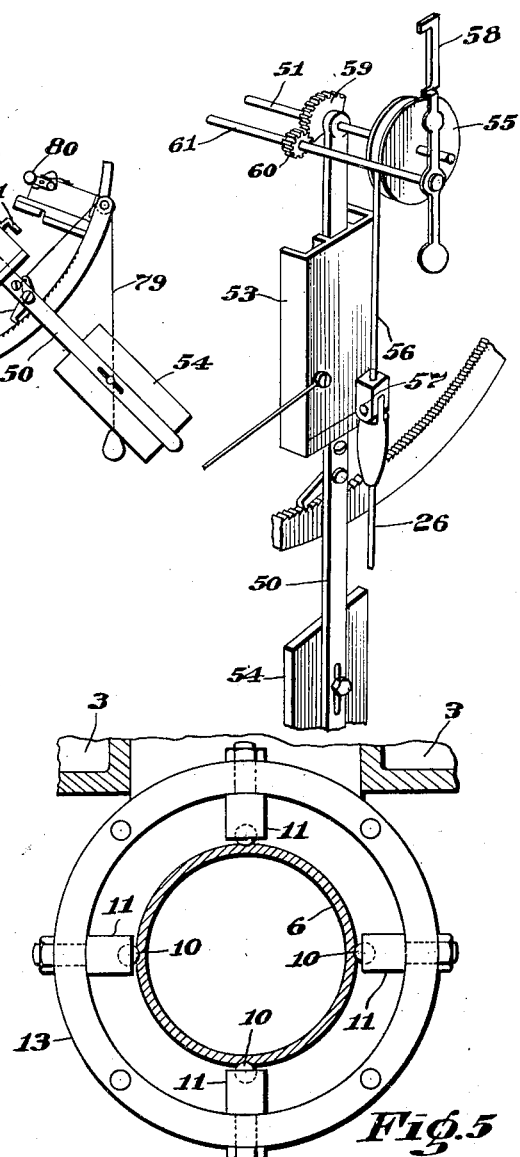
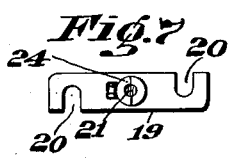
INVENTOR
Giles E. Hopkins
BY
ATTORNEY Patented Oct. 24, 1933

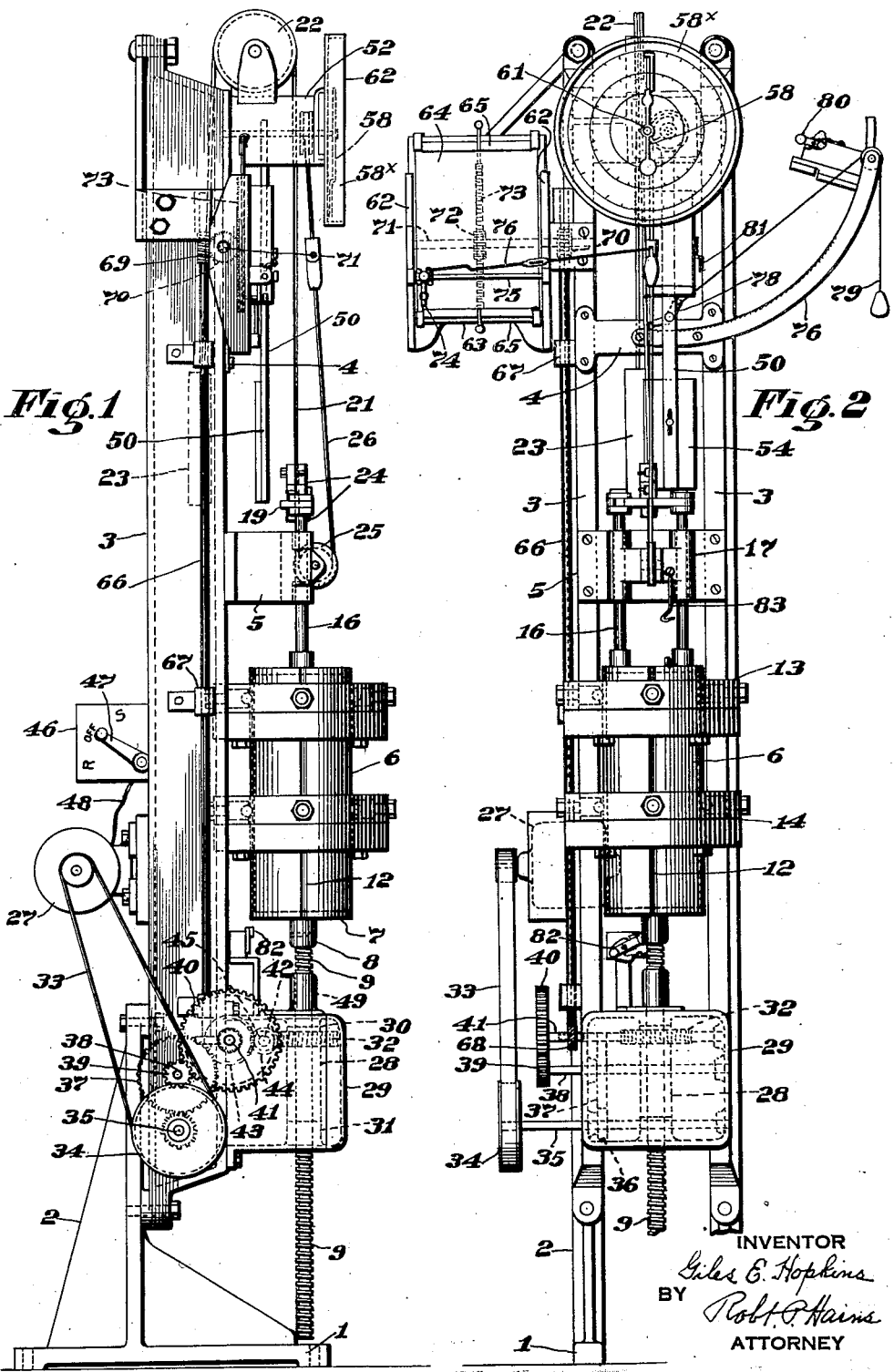

1,931,925

UNITED STATES PATENT OFFICE 1,931,925

MASS TESTING MACHINE

Giles E. Hopkins, Arlington, Mass., assignor to Bigelow-Sanford Carpet Co. Inc.

Application July 8, 1932. Serial No. 621,364

6 Claims. (Cl. 265—17)

This invention relates to machines for measuring those physical characteristics of a mass of fibrous material which are usually expressed by such terms as "resilience", "softness", "loftiness", and "stiffness".

Heretofore the softness, stiffness and resilience of fibres have been determined largely by manually feeling the fibres in the loose unspun condition and also after the fibres have been spun and woven to form a fabric such as pile fabric.

It is desirable to provide a machine for determining the properties just mentioned with a higher degree of accuracy than can be determined by a manual examination of the fibres, and for recording or plotting the results of the tests for comparison and future reference.

The present invention therefore relates to fibre testing machines for accurately determining the action of a mass of fibres under various compression forces and for recording the results of the tests, preferably in the form of a plotted pressure-volume curve.

One important feature of the present invention resides in a container for confining the mass of fibres to be tested and in mechanism for compressing the fibres therein, with associated means for indicating or recording the reduced volume of the compressed fibres and the pressure to which the fibres are subjected as the volume changes.

Another feature of the invention consists in means for gradually increasing or decreasing the compression force so that one curve or set of readings may be secured as the fibres are compressed and another as the compressed fibres are permitted to expand to thereby indicate the resiliency of the mass.

Another feature of the invention resides in automatic stop means for arresting the fibre compressing mechanism when the fibres are subjected to a predetermined pressure.

A more specific feature of the invention resides in a container for the fibres supported for axial movement and provided with a relatively movable plunger or closure for one end of the container, the arrangement being such that as the container is advanced towards the plunger the confined fibres will exert an increasing pressure upon the plunger. The desired readings are secured by determining the container movement and corresponding pressure upon the plunger.

A further feature of the invention resides in means for yieldingly opposing the plunger movement and for connecting the plunger to said yielding means.

Other features of the invention and novel combination of parts in addition to the above will be hereinafter described in connection with the accompanying drawings which illustrate one good practical form of the invention.

In the drawings:—

Fig. 1 is a side elevation of a testing machine constructed in accordance with the present invention;

Fig. 2 is a front elevation of Fig. 1 showing the parts in position ready to start the testing operation;

Fig. 3 is a view similar to Fig. 2 showing the test partly completed and the fibre container in section;

Fig. 4 is a perspective view of the pendulum weight and associated parts;

Fig. 5 is an enlarged sectional view taken on the line 5—5 of Fig. 3;

Fig. 6 is a perspective view of cable connecting means to be described; and

Fig. 7 is a top plan view of a link shown in Fig. 6.

In the embodiment of the invention shown the testing machine is supported in an upright position and is provided with the base plates 1 adapted to rest upon the floor or other supporting surface. The base plates 1 have the upwardly extending flanges 2 to which the posts or uprights 3 are secured and these posts are connected by the transversely extending braces 4, 5.

The mass of loose fibres to be tested is confined in a container 6, which in the construction shown is cylindrical in shape and is supported for vertical sliding movement. The cylinder 6 has a bottom or closure 7 rigidly secured to the cylinder and has a hollow, downwardly extending boss or sleeve 8 in which the upper end of an operating screw 9 is rigidly secured.

In order to provide for accurate readings, the operating parts should offer little friction. The cylinder 6 is, therefore, shown as supported for vertical sliding movement on the antifriction balls 10 mounted in supporting blocks 11 and adapted to project into longitudinally extending slots or grooves 12 formed in the outer wall of the cylinder. The blocks 11 are supported by the spaced rings 13 and 14 surrounding the cylinder 6 and secured to the uprights 3.

The upper end of the container 6 in the present construction is closed by an independently supported plunger or closure 15 which fits slidably in the upper end of the container and is supported for vertical sliding movement by the plunger guide rods 16 that are slidably mounted in bosses 17 upon the bridge bar 5. The rods 16 are provided adjacent their upper ends with the spaced shoulders 18 adapted to receive between them the link 19 having the oppositely facing notches 20, Fig. 7, that receive the reduced portions of the rods 16 between the shoulders 18.

The weight of the plunger 15 is preferably counterbalanced by a cable 21 extending upwardly from the link 19 about the sheave 22 and provided at one end with the counterbalancing weight 23.

The cable 21 may be secured to the link 19 by the clamps 24 disposed at the opposite faces of the link, and in the construction shown a portion of the cable 21 extends downwardly about the sheave 25 rotatably supported by the bridge bar 5 and extending upwardly therefrom as indicated at 26 so that it may be connected to pendulum weight means and an indicator to be described.

In the construction shown power mechanism is provided to impart the desired axial movement to the cylinder 6, and since it may be desirable to determine the expansive action of the fibres as well as the fibre compression a reversible electric motor 27 is preferably provided to raise and lower the cylinder at the desired rate of speed. This motor is conveniently mounted upon the uprights 3, as shown.

The container 6 is raised and lowered by the operating screw 9 which is held from rotating and is attached to the lower end of the container, as above described. The screw 9 extends downwardly through a threaded sleeve 28 rotatably supported between the bearings 30, 31. The casing 29 is supported by the flanges 2 below the cylinder 6, and the threaded sleeve 28 is rotated by the worm gear 32 mounted thereupon.

Power is imparted from the motor 27 to the sleeve 28 through any suitable train of reducing gears, and in the construction shown the motor 27 drives the belt 33 which rotates a pulley 34 and its shaft 35 is rotatably supported by the gear casing 29. The shaft 35 is provided with a pinion 36 that drives a gear 37 secured to a second shaft 38, and this latter shaft has a pinion 39 that meshes with a gear 40 which is secured to a third shaft 41. The shaft 41 drives a fourth shaft 42 through gears 43 and 44 and the shaft 42 is provided with a worm 45 that meshes with and drives the worm gear 32.

The reversing motor 27 may be controlled by the switch board 46 having the switch lever 47 that may be shifted to the starting position "S" to rotate the motor in one direction, to the "off" position to stop the motor and to the reverse position "R" to operate the motor in the opposite direction. The switch board 46 is shown as connected to the motor 27 by the conductors 48.

It will be seen from the power operating mechanism described that rotation of the motor 27 through the reducing gears rotates the threaded sleeve 28 to raise or lower the cylinder 6, depending upon the direction in which the motor rotates, and the vertical sliding movement of the threaded shaft 9 is guided by a fixed sleeve 49 upon the gear casing 29.

The rising movement imparted to the cylinder 6 by the screw 9 serves to compress the fibres F in the cylinder and to cause them to exert an upward pressure upon the plunger 15. Various means may be provided for determining the pressure exerted upon the fibres, and one good practical means will now be described for yieldingly resisting the upward pressure upon the plunger and for indicating the pressure exerted thereupon.

This is accomplished in the construction shown by employing a pendulum weight comprising the pendulum arm 50 which is secured to and rotatably supported by the shaft 51 journaled in the casing 52 of the indicating device to be described. The arm 50 is shown as having the upper weight 53 and lower weight 54 and the latter is adjustable lengthwise of the arm to vary its leverage action. The means shown for operatively connecting the sliding plunger 15 to the pendulum supporting shaft 51 comprises a sheave 55 secured to the shaft 51, and this sheave has secured thereto and extending downwardly therefrom a strap or cable 56 which is secured by a bolt 57 to the connection at the upper end of the cable 26. The arrangement is such that as the plunger 15 is elevated by the pressure of the fibres thereagainst the link 19 connected to the cable 26 will exert a pull upon this cable in a direction to turn the sheave 55 and impart an upward swinging movement to the weighted arm 50 as will be apparent from Figs. 3 and 4.

The movement imparted to the arm 50 is preferably less than 90°, while it is desirable to cause this limited movement to rotate a pointer 58 through practically a complete circle. The shaft 51 is therefore shown as provided with the segmented gear 59 adapted to rotate the pinion 60 secured to the pointer operating shaft 61 mounted centrally of the indicating dial $58^x$. The indicating mechanism just described will serve to indicate in pounds or other units the pressure exerted upon the mass of fibres F.

It is desirable to determine the compressing movement imparted to the cylinder 6 and the corresponding pressure exerted upon the fibres or plunger 15, and to plot these values in the form of a pressure-volume curve.

This is accomplished in the construction shown by securing to one of the uprights 3 a chart supporting frame provided with the guide-ways 62 adapted to slidably support a platen 63 for a recording chart 64 and the platen is provided at its ends with the chart holding clamps 65. Sliding movement is imparted to the platen 63 proportionate to the movement imparted to the cylinder 6, and this is accomplished in the construction shown by providing the vertically extending shaft 66 which is rotatably supported adjacent an upright 3 by the bearings 67. The shaft 66 may be rotated from the shaft 41 by the gears 68 and this shaft is provided at its upper end with a worm 69 adapted to rotate a worm wheel 70 upon a shaft 71 extending transversely of the platen support. The shaft 71 is provided with a gear 72 that meshes with a rack 73, secured to the platen. The arrangement is such that the platen 63 is lowered as the container 6 is raised.

The platen 63 is provided with a cooperating pen or marker 74 slidably mounted upon a transversely extending rod 75 which rod may be supported by the guide ways 62. Movement is imparted from the swinging arm 50 to the marker 74 by the connecting link 76 connecting pointer 74 to weight 53. The construction is such that when a mass of fibres is to be tested the parts are positioned as shown in Fig. 2 and the marker 74 is set at the zero position upon the chart 64. The motor 27 may then be started to compress the fibres in the container 6 and during the compressing operation the platen will move downward and the marker will be moved laterally to produce a compression curve C upon the chart. Upon the completion of this test a second curve may be produced upon the chart as the pressure upon the fibres is decreased, and the difference in these curves will represent the loss in volume.

It may be desirable to associate with the swinging arm 50 the arcuate guide 77 and to provide the arm 50 with a ratchet pawl 78 adapted to engage teeth upon the guide 77 and hold the arm 50 at different inclinations to the vertical or to stop its downward swinging movement, and the pawl 78 may be released by pulling the releasing cord 79.

It is important to provide means for stopping the operating motor when a predetermined maximum pressure has been exerted upon the fibres and this is accomplished by providing a motor stopping switch 80 adapted to cut off the current to the motor 27, and positioned to be actuated by a projection 81 upon the arm 50 as this arm approaches the upper limit of its stroke.

A similar switch 82 may be provided to arrest the motor as the cylinder 6 approaches the lower end of its path of travel, and this switch is conveniently mounted in position to be actuated by the downward movement of the cylinder as shown in Figs. 1 and 2.

When it is desired to place fibres in or remove them from the cylinder 6, the plunger 15 may be released from the cable connections 21, 26 by swinging the link 19 out of engagement with the rods 16, whereupon the plunger may be held in its uppermost position by a hook 83, see Fig. 2.

It will be seen from the foregoing that the resilient properties of a mass of fibres may be readily and accurately determined by the testing machine of the present invention and that plotted curves may be produced during the testing operation to show both the compression properties and expansion properties of the fibres being tested.

What is claimed is:

1. In a machine for testing the resiliency of a mass of fibres, the combination of a container closed at one end for confining the fibres, a fibre confining plunger slidable in the other end of the container, mechanism for bodily moving the container axially to compress the fibres between the closed end of the container and the slidable plunger to exert pressure upon the plunger, means for resisting movement of the plunger, and indicating mechanism connected to the plunger for indicating the pressure exerted upon the plunger by the confined fibres during the container movement.

2. In a machine for testing the resiliency of a mass of fibres, the combination of a container closed at one end for confining the fibres, a fibre confining plunger slidable in the other end of the container, yieldable means connected to the plunger for opposing movement of the plunger, a motor for bodily moving the container in an axial direction to compress the fibres between the closed end of the container and the plunger and exert pressure upon the plunger, and indicating mechanism connected to the plunger for denoting the movement imparted to the plunger by the bodily movement of the container.

3. In a machine for testing the resiliency of a mass of fibres, the combination of a container having a closed end for confining fibres and mounted for bodily movement in an axial direction, a plunger mounted in the other end of the container for sliding movement, power mechanism operatively connected to the container for moving it in an axial direction, yielding means connected to the plunger normally to resist movement of the plunger under the pressure of the fibres, indicating means connected to the plunger to indicate the pressure and movement of the plunger by the fibres in the container as the latter is bodily moved in an axial direction by the power mechanism, and stopping means for the power mechanism acting automatically to stop the latter when the plunger has been moved a predetermined amount.

4. In a machine for testing the resiliency of a mass of fibres, the combination of a container closed at one end for confining fibres and mounted for bodily movement in an axial direction, an electric motor for bodily moving the container axially, a plunger mounted in the container for sliding movement relative thereto, guide rods for directing the movement of the plunger, a weight and connections with the plunger for resisting movement of the plunger under the pressure of the fibres as the container is moved axially, and means connected to the weight for indicating the movement of the plunger by the fibres in the container as the latter is bodily moved by the motor.

5. In a machine for testing the resiliency of a mass of fibres, the combination of a container having closed ends for confining the mass of fibres and mounted for bodily movement in an axial direction, a plunger mounted for sliding movement in the container, yielding means normally acting to resist movement of the plunger in the container under the pressure of the fibres, guide rods secured to the plunger for directing its movements, a counterweight connected to the guide rods for counterbalancing the weight of the plunger, means for positively moving the container axially, and indicating means for indicating the pressure-volume of the fibre.

6. In a machine for testing the resiliency of a mass of fibres, the combination of a container having a closed end for confining fibres, a plunger mounted in the other end of the container for sliding movement therein, guide rods secured to the plunger for directing its movements, a fixed guiding brace for the guide rods, a link connected to the guide rods, a flexible member secured to the link having a connected counter-balance, a guide for the flexible member fixed to the brace, a pendulum weight and indicator connected to the flexible member above the fixed brace normally acting to resist movement of the plunger, and means for moving the container axially to compress the contained fibres and exert pressure upon the plunger.

GILES E. HOPKINS.